US012808701B2

(12) United States Patent
Rixon et al.

(10) Patent No.: US 12,808,701 B2
(45) Date of Patent: Nov. 24, 2026

(54) SENSOR HOLDER FOR ELECTRICAL MOTOR CONTROLLER

(71) Applicant: Nidec Motor Corporation, St. Louis, MO (US)

(72) Inventors: Warren Rixon, Springfield, IL (US); Jeffrey Scott Sherman, Creve Coeur, MO (US); Chetan O. Modi, Valley Park, MO (US)

(73) Assignee: Nidec Motor Corporation, Creve Coeur, MO (US)

( * ) Notice: Subject to any disclaimer, the term of this patent is extended or adjusted under 35 U.S.C. 154(b) by 187 days.

(21) Appl. No.: 18/673,597

(22) Filed: May 24, 2024

(65) Prior Publication Data

US 2024/0393148 A1 Nov. 28, 2024

Related U.S. Application Data

(60) Provisional application No. 63/504,451, filed on May 26, 2023.

(51) Int. Cl.
*H02K 11/20* (2016.01)
*G01D 11/30* (2006.01)
*H02K 11/30* (2016.01)

(52) U.S. Cl.
CPC ............ *G01D 11/30* (2013.01); *H02K 11/20* (2016.01); *H02K 11/30* (2016.01)

(58) Field of Classification Search
CPC .... H02K 11/215; H02K 11/225; H02K 11/33; H02K 11/20; H02K 11/30; G01N 27/82; G01D 11/30
See application file for complete search history.

(56) References Cited

U.S. PATENT DOCUMENTS

| | | | |
|---|---|---|---|
| 4,061,935 A | 12/1977 | Kandpal | |
| 4,567,390 A | 1/1986 | Stewart | |
| 4,734,602 A | 3/1988 | Hauser et al. | |
| 5,684,347 A | 11/1997 | Vogt et al. | |
| 5,723,922 A | 3/1998 | Fowlkes | |
| 7,402,925 B2 | 7/2008 | Best et al. | |
| 7,535,136 B2 | 5/2009 | Rush et al. | |
| 8,258,660 B2 | 9/2012 | Stroebel et al. | |
| 8,492,943 B2 | 7/2013 | Fargo et al. | |
| 9,112,396 B2 | 8/2015 | Lindblom et al. | |
| 9,608,499 B2 | 3/2017 | Bessho et al. | |
| 2017/0077631 A1* | 3/2017 | Mitteer | H05K 3/366 |

(Continued)

*Primary Examiner* — Leda T Pham
(74) *Attorney, Agent, or Firm* — Hovey Williams LLP

(57) ABSTRACT

A sensor holder for an electrical motor controller. The sensor holder is configured for holding a sensor relative to a printed circuit board of an electrical motor controller. The sensor holder includes a body having a first side and a second side; and a retainer coupled to the first side and extending away from the first side and comprising a base coupled to the first side. Furthermore, the sensor holder includes an arm coupled to the base and extending away from the base wherein the base and arm are configured to receive the sensor. A spacer is coupled to the first side and configured to form a space between the sensor and the first side. Moreover, a support is coupled to the body and extending away from the body and coupled to the printed circuit board to position the retainer and the received sensor away from the printed circuit board.

15 Claims, 5 Drawing Sheets

(56) References Cited

U.S. PATENT DOCUMENTS

| | | | | |
|---|---|---|---|---|
| 2021/0317974 | A1* | 10/2021 | Winans ................. | F21V 21/088 |
| 2022/0247278 | A1 | 8/2022 | Setbon et al. | |
| 2022/0337132 | A1 | 10/2022 | Silvery et al. | |

* cited by examiner

SENSOR HOLDER FOR ELECTRICAL MOTOR CONTROLLER

PRIORITY APPLICATION

The present application claims the benefit of and priority from U.S. Provisional Application No. 63/504,451 filed May 26, 2023, the entire disclosure of which is hereby incorporated by reference herein.

BACKGROUND

The embodiments described herein relate generally to electrical motors, and more particularly, to holders that position a sensor on a printed circuit board of the electrical motor.

An electric motor often includes a controller having a printed circuit board (PCB) with multiple electrical components such as a negative temperature coefficient (NTC). An NTC, however, can generate elevated temperatures which can lead to adverse operational issues for the PCB. For example, the temperature of the PCB may be above the temperature limit of the potting compound which may lead to potting compound degradation. Additionally, a higher temperature of the NTC can adversely heat other electrical components such as a rectifier.

Some existing controllers suspend the NTC beyond the potting shield by directly coupling ceramic feet to the NTC (see for example FIG. 1) and coupling the ceramic feet to the PCB. The design of the ceramic feet, however, can act as a pendulum leading to negative issues such as vibration failure of the NTC or the NTC becoming separated from the ceramic feet. Additionally, ceramic feet manufacturing can be costly, difficult and/or time consuming.

Moreover, for some conventional PCBs, an electrical component, such as rectifier, which is positioned adjacent to the NTC requires being kept at a lower temperature than the hotter NTC. Conventional PCBs may position an aluminum heat sink between the NTC and the rectifier wherein the NTC can be fastened to the aluminum heat sink by a room temperature vulcanization (RTV) adhesive or glue. However, the NTC temperature may exceed the heat sink capabilities and heat the rectifier. Moreover, when being assembled onto the PCB, the amount of RTV adhesive may not be a tightly controlled process leading to controller inefficiencies. Overall, the use of ceramic feet and heat sinks may require multiple pre-assemblies and/or tightly controlled manufacturing/assembly processes. Additionally, these ceramic feet and heat sinks can be complicated and high-cost relative to their respective functions.

If not properly dissipated, heat generated by electrical components and/or other components during operation of the motor can shorten the life span of the various electronics and/or motor components and can generally result in poor performance of the motor.

A current need exists for a sensor holder that optimally positions a heat generating electrical sensor so as to properly dissipates heat. A need also exists for a sensor holder that is supported beyond the level of the potting shield. Moreover, a need exists for a sensor holder that reduces and/or eliminates motor vibration effects applied to the sensor. Additionally, a need exists for a sensor holder that provides a heat shield so that the NTC does not heat adjacent electrical components. Still further, a need exists for a sensor holder that reduces the number of parts in a bill of material and simplifies the assembly process of the sensor holder to the PCB.

BRIEF DESCRIPTION

In one aspect, a sensor holder for an electrical motor controller is provided. The sensor holder is configured for holding a sensor relative to a printed circuit board of an electrical motor controller. The sensor holder includes a body having a first side and a second side; a retainer coupled to the first side and extending away from the first side and comprising a base coupled to the first side. Furthermore, the sensor holder includes an arm coupled to the base and extending away from the base wherein the base and arm are configured to receive the sensor. A spacer is coupled to the first side and configured to form a space between the sensor and the first side. Moreover, a support is coupled to the body and extending away from the body and coupled to the printed circuit board to position the retainer and the received sensor away from the printed circuit board.

DETAILED DESCRIPTION

Figure 1:
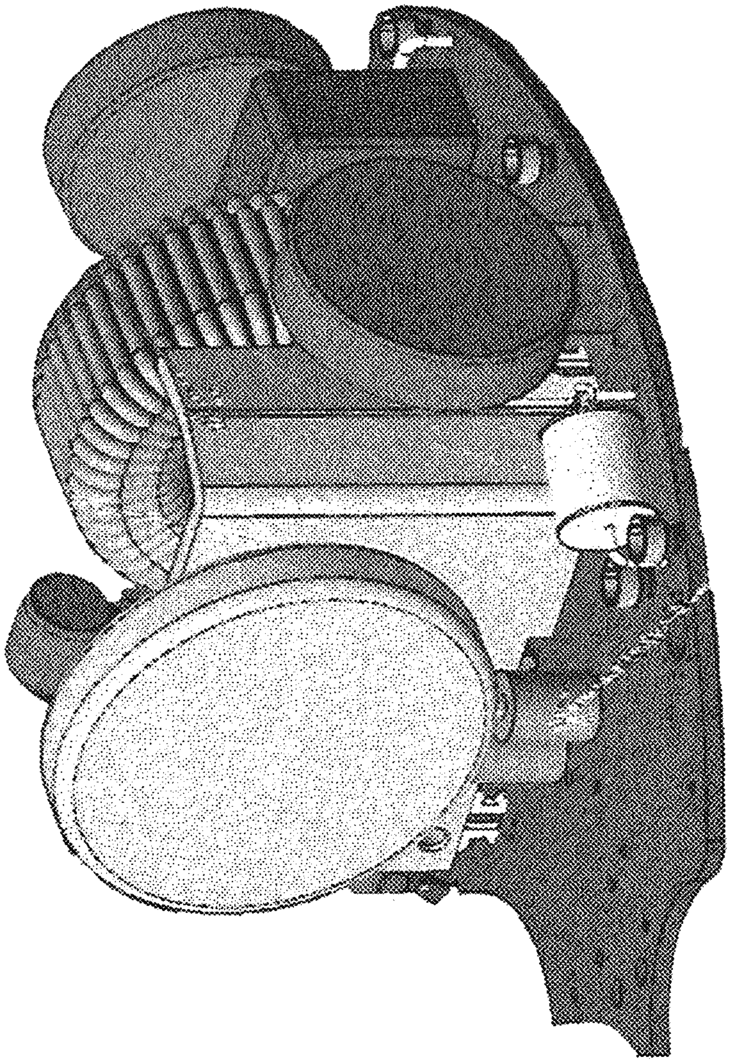
Fig. 1. PRIOR ART
FIG. 1 is a perspective view of a PCB and NTC supported by conventional ceramic feet.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (for example "between" versus "directly between," "adjacent" versus "directly adjacent," et cetera). As used herein, the term "and/or" includes any and all combinations of one or more of the associated listed items.

Although the terms "first, second, third", et cetera may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (for example of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints and sub-ranges given for the ranges.

As used herein, the term "computer" and related terms, for example, "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein. Further, as used herein the terms "software" and "firmware" are interchangeable and include any computer program stored in memory for execution by computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and nonvolatile media, and removable and non-removable media such as a firmware, physical and virtual storage, CD-ROMS, DVDs, and any other digital source such as a network or the Internet, as well as yet to be developed digital means, with the sole exception being a transitory, propagating signal.

Figure 2:
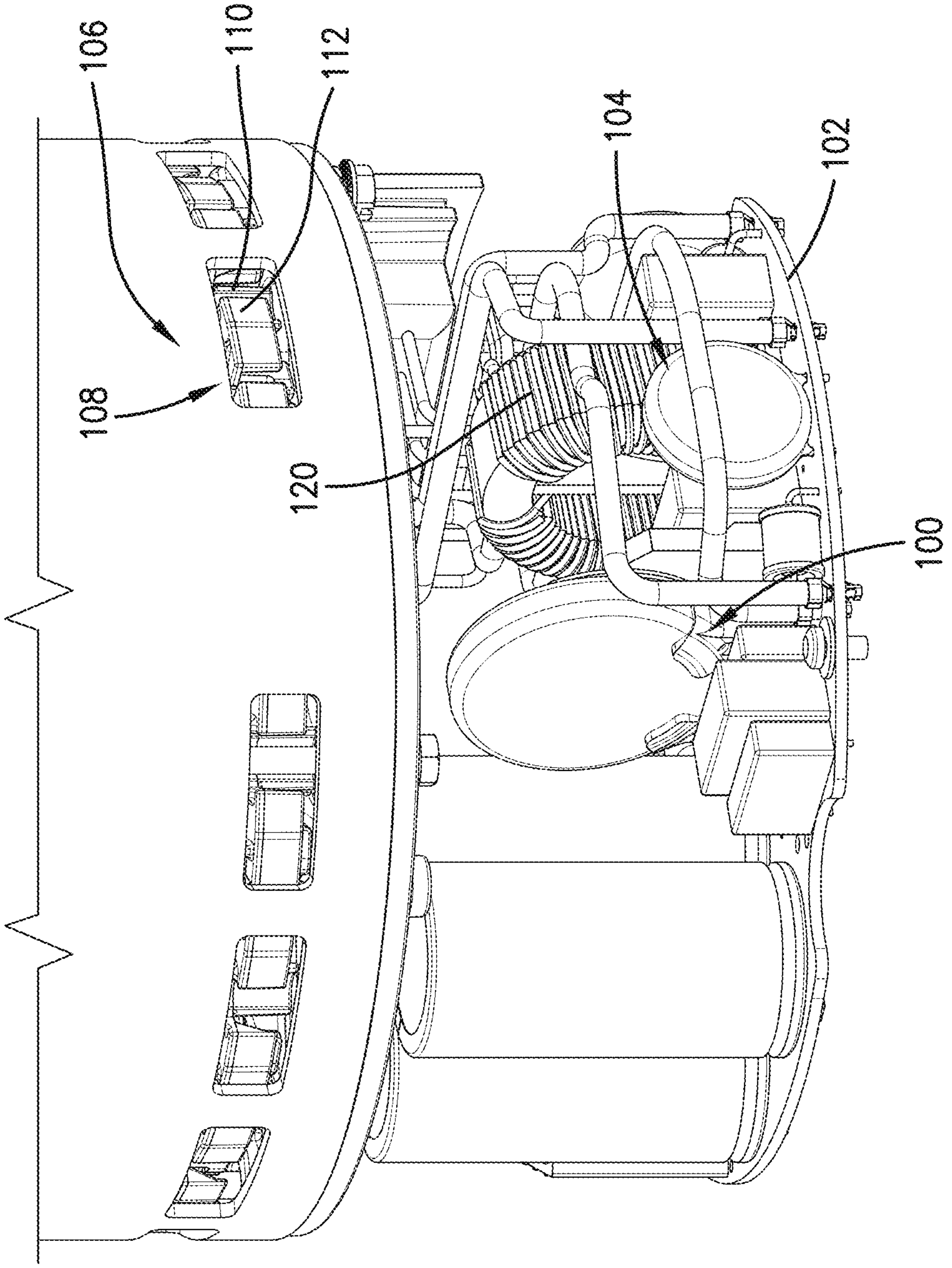
FIG. 2 is a perspective view of an exemplary embodiment of a sensor holder coupled to a PCB of an electrical motor controller for an electrical motor.

FIG. 2 is a perspective view of an exemplary embodiment of a sensor holder 100 coupled to a PCB 102 of an electrical motor controller 104 for an electrical motor 106. The electrical motor 106 of the present disclosure includes a stator 108 including stator core having slots 110, and windings 112 having wire extending through the slots 110. The windings 112 include end turns extending from the slots 110. Moreover, the electrical motor 106 includes a rotor (not shown) having a rotor core and associated magnets (not shown). The controller 104 is configured to control the electrical motor via the windings 112.

Figure 3:
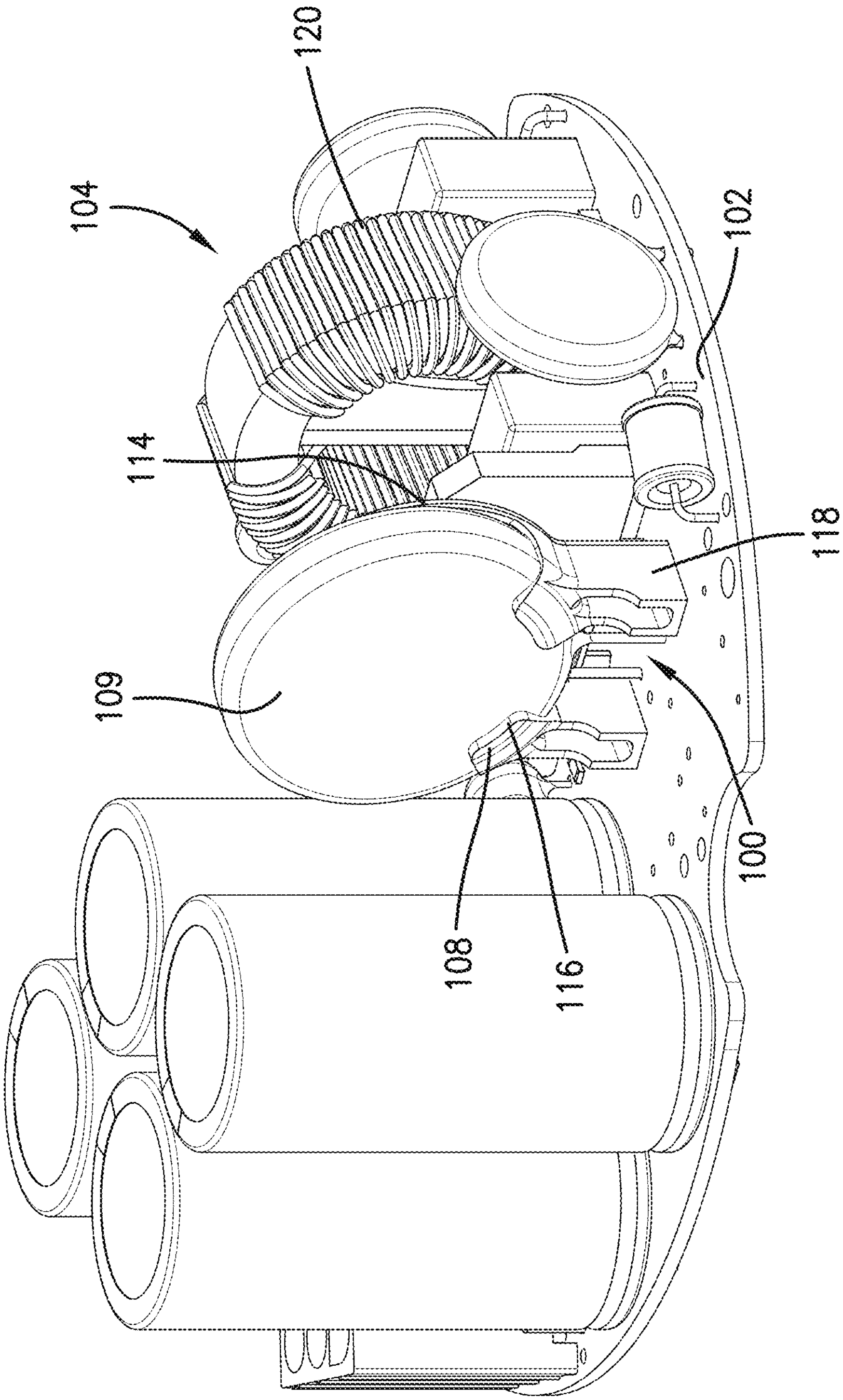
FIG. 3 is a partial view of the exemplary sensor holder of FIG. 2 coupled to the PCB of the electrical motor controller and the sensor holder positions a sensor relative to the PCB.
Figure 4:
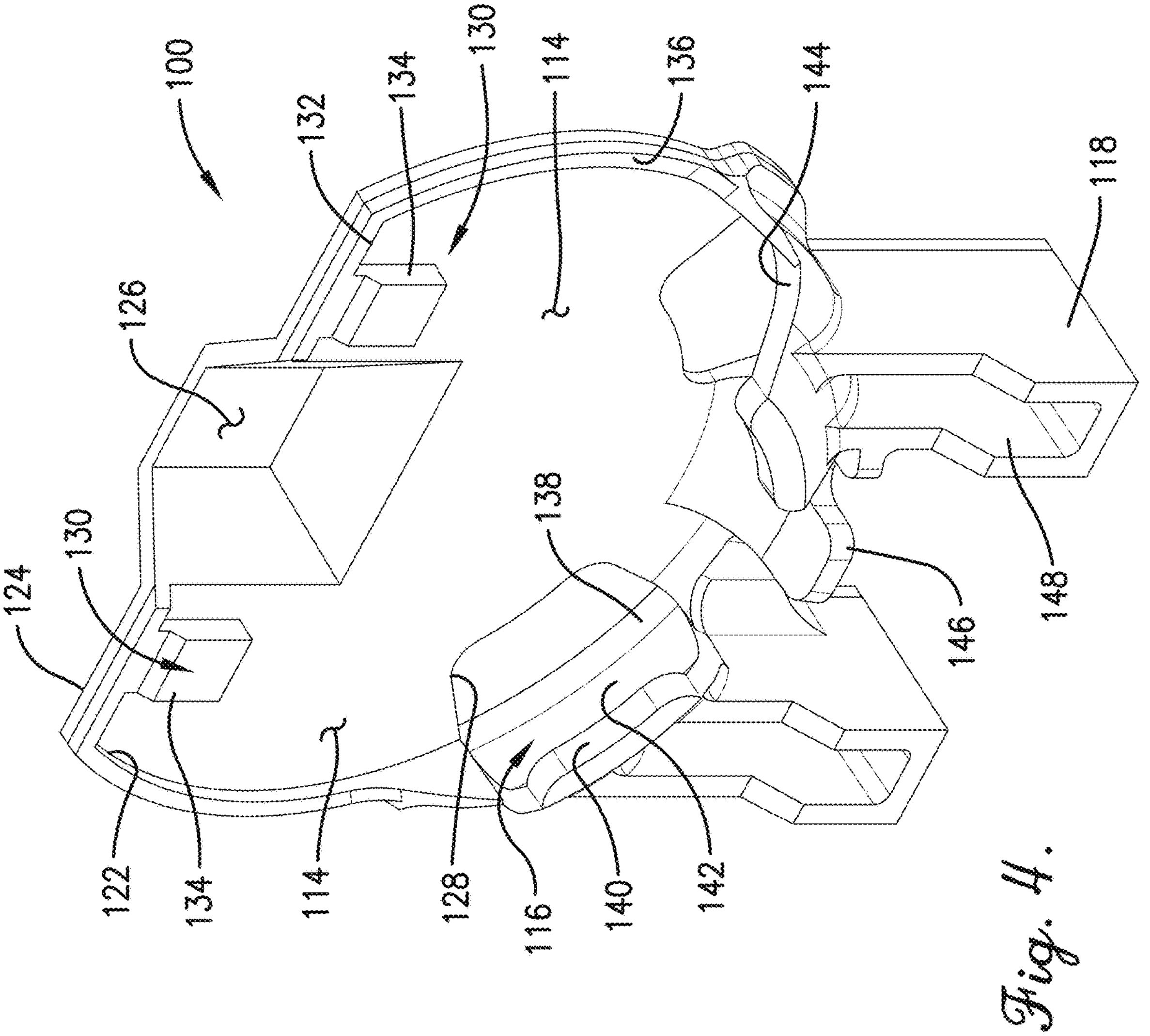
FIG. 4 is a perspective view of the sensor holder of FIG. 2 illustrating a body, a retainer, and a support of the sensor holder.

FIG. 3 is a partial view of the exemplary sensor holder 100 of FIG. 2 coupled to the PCB 102 of the electrical motor controller 104 and the sensor holder 100 positions a sensor 109 relative to the PCB 102. FIG. 4 is a perspective view of the sensor holder 100 of FIG. 3 illustrating a body 114, a retainer 116, and a support 118 of the sensor holder 100. In an exemplary embodiment, the body 114, the retainer 116, and the support 118 of the sensor holder 100 are an integral, single piece of electrically insulating, non-metallic material, for example, a plastic material such as nylon. The sensor holder 100 may alternatively include multiple non-integrated pieces. Note that in some embodiments, the material of the sensor holder 100 is chosen to withstand a corrosive or chemical-laden environment. In one embodiment, the sensor 109 is an electrical component such as but not limited to an NTC. The sensor 109 can be any device of the type that senses parameters such as current and temperature and is adapted to cut power to the electrical motor in response to excessive heat or a current abnormality.

Referring to FIG. 4, the body 114 of the sensor holder 100 includes a first side 122 and a second side 124 that form a semi-circular shape. Alternatively, the first side 122 and the second side 124 can form a non-circular shape. The shape of the body 114 is configured to facilitate holding and positioning the sensor 109 and forming a heat shield between the body 114 and other electrical components 120, for example a rectifier, of the controller 104. The first side 122 and the second side 124 form the shape to facilitate optimally sizing the sensor holder 100 for placement on the PCB 102 and relative to the other electrical components 120 and for reducing weight of the sensor holder 100. In the embodiment, the body 114 includes a channel 126 formed within the first side 122. The channel 126 is configured to automate or assist in RTV application to secure the sensor 109 to the sensor holder 100.

The body 114 further includes at least one aperture 128 defined through the first side 122 and the second side 124. In an embodiment, the aperture 128 facilitates injection-molding manufacturing of the sensor holder 100. The aperture 128 can also be configured to facilitate airflow between the first side 122 and the second side 124 to facilitate heat transfer within the controller 104. Furthermore, the first side 122 includes a spacer 130 which is configured to separate or space the sensor 109 (FIG. 2) away from the first side 122. The spacer 130 is configured to form a space or distance between the sensor 109 and the first side 122 to facilitate airflow between the first side 122 and the sensor 109 for optimal heat transfer from the sensor 109. More particularly, the spacer 130 includes a first portion 132 coupled to a straight side of the first side 122. The first portion 132 includes at least one section 134 that extends from the first portion 132 and toward the support 118. Preferably, the first portion 132 includes two sections 134. Alternatively, the first portion 132 can include less than two sections 134 or more than two sections 134. As shown, the spacer 130 further includes a second portion 136 coupled to an arcuate side of the first side 122.

Still referring to FIG. 4, in the exemplary embodiment, the retainer 116 is coupled to the body 114. The retainer 116 can be removably coupled or integrally coupled to the body 114. More particularly, the retainer 116 is coupled to the first side 122 and extends away from the first side 122. In an embodiment, the retainer 116 extends substantially perpendicular away from the first side 122. Alternatively, the retainer 116 can extend at any angle relative to the first side 122. The retainer 116 includes a base 138 coupled to the first side 122 and includes an arm 140 coupled to the base 138. Preferably, the arm 140 extends substantially perpendicular away from the base 138. The arm 140, however, can extend at any angle relative to the base 138. In an embodiment, the base 138 and the arm 140 are arcuately shaped. Alternatively, the base 138 and the arm 140 can be non-arcuately shaped. The base 138 and the arm 140 are sized and shaped to removably receive, suspend, hold and/or position the sensor 109 next to the body 114 of the sensor holder 100. More particularly, the base 138 and the arm 140 position the sensor 109 against the sections 134 of the spacer 130 and/or against the first portion 132 and the second portion 136 of the spacer 130.

In an embodiment, the retainer 116 includes a first retainer 142 and a second retainer 144 respectively. Alternatively, the retainer 116 can include a single retainer or more than two retainers. The first retainer 142 and the second retainer 144 are spaced away from each other and may be positioned at an angle from about 50 degrees to about 90 degrees relative to the body 114 and/or to each other. The first retainer 142 and the second retainer 144 are positioned to optimally removably receive, suspend, hold and/or position the sensor 109. Alternatively, the first retainer 142 and the second retainer 144 can permanently receive the sensor 109.

In the exemplary embodiment, the retainer 116 includes a third retainer 146 coupled to the first side 122. Preferably, the third retainer 146 is positioned between the first retainer 142 and the second retainer 144. The third retainer 146 is also configured to removably receive, suspend, hold and/or position the sensor 109 in addition the first retainer 142 and the second retainer 144. Alternatively, the retainer 116 may not include the third retainer 146 but include the first retainer 142 and the/or the second retainer 144. Still further, the body 114 may include the third retainer 146 but not include the first retainer 142 and/or the second retainer 144.

The support 118 is coupled to the body 114 and is coupled to the first retainer 142 and the second retainer 144. The support 118 extends substantially perpendicular away from the body 114 and/or the base 138. Alternatively, the support 118 can extend at any angle relative to the body 114 and/or the base 138. In the exemplary embodiment, the support 118 includes a leg 148 coupled to the base 138 and coupled to the printed circuit board 102. The leg 148 can removably couple to the printed circuit board 102 or can integrally couple to the printed circuit board 102. In an embodiment, the leg 148 can be held by solder joints of the PCB 102 and/or held by RTV between the PCB 102 and the leg 148. The leg 148 is configured to position and support the body 114 and retainer 116 away from the printed circuit board 102. Additionally, the leg 148 is configured to reduce or eliminate vibrations generated by or from the motor operation being transferred to the body 114 and/or to the sensor 109. In an embodiment, the support 118 includes a first support 150 and a second support 152. The first support 150 and the second support 152 are spaced away from each other to optimally stabilize the body 114, the retainer 116, and sensor 109 relative to the PCB 102. Alternatively, the support 118 can include a single support or more than two supports.

During motor operation, the legs 148 position the retainers 142, 144 away from the PCB 102 wherein the base 138 and the arm 140 removably receive, suspend, hold and/or position the sensor 109. When the sensor 109 is placed in the base 138 and the arm 140, the spacer 130 positions the sensor 109 away from the first side 122 of the body 114. More particularly, the sensor 109 abuts against the first portion 132 and associated sections 134. The legs 148 of the support 118 position the retainer 116 and sensor 109 at a pre-determined height above the PCB 102 such that a pre-assembly process is not required. Additionally, during motor operation, the legs 148 of the support 118 facilitate minimizing and/or eliminating vibrations effects of the motor being applied to the sensor holder 100. Moreover, the configuration and assembly of the sensor holder 100 consolidates the design of the controller by reducing the number of parts for the controller bill of material. Additionally, the second side 124 of the body 114 which is positioned near the other electrical components 102 such as the rectifier acts as a heat shield to reduce or prevent the sensor 109 from heating the electrical component 120.

Figure 5:
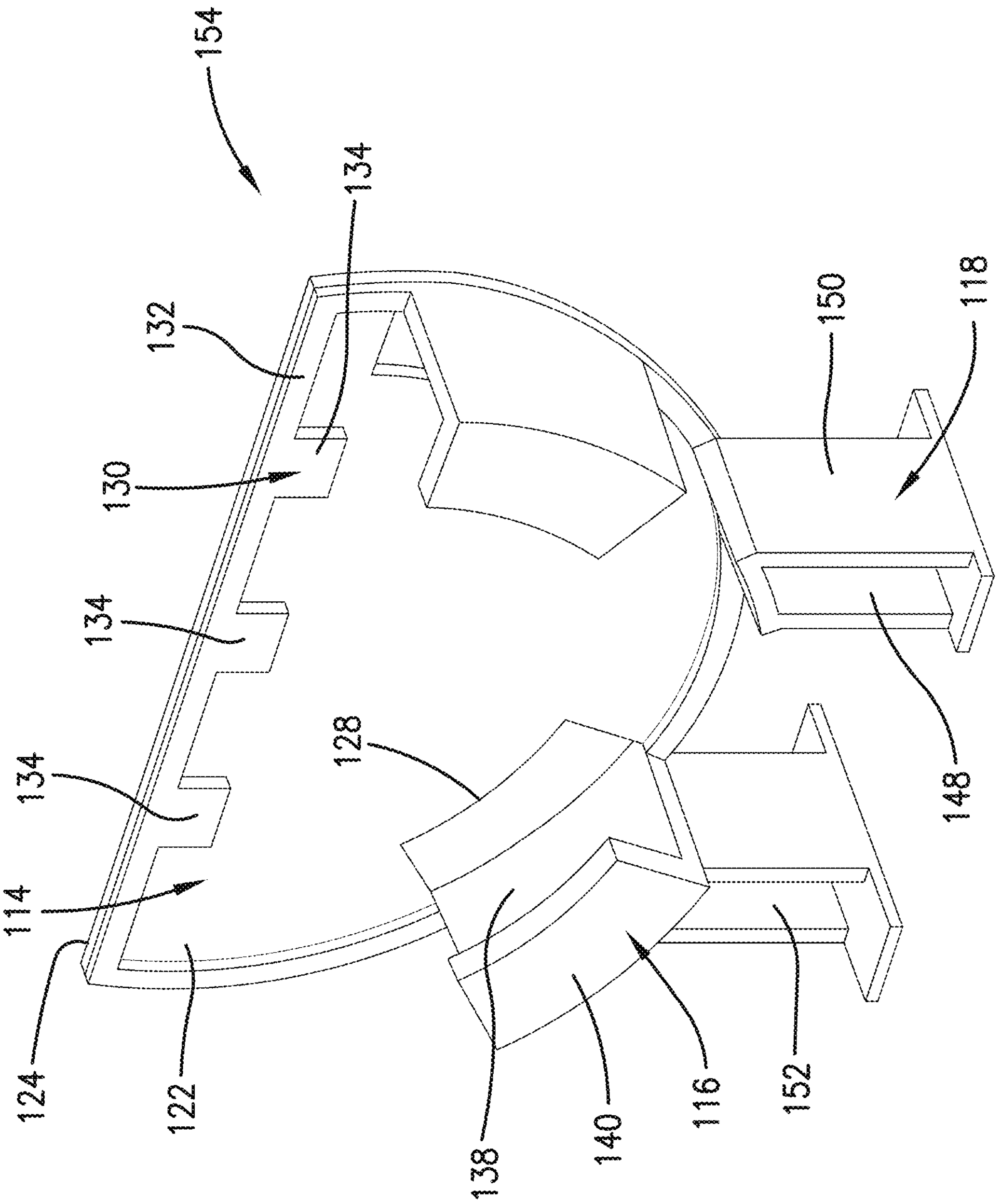
FIG. 5 is a perspective view of an exemplary embodiment of a sensor holder.

FIG. 5 is a perspective view of another exemplary embodiment of a sensor holder 154. In FIG. 5, the same element numbers are used for the same or similar components for sensor holder 154. The exemplary sensor holder 154 does not include a channel or a third retainer 146. The spacer 130 of the sensor holder 154 includes three sections 134 coupled to the first portion 132. Alternatively, the spacer 130 can include less than three sections 134 or more than three sections 134. The sections 134 are sized and shaped to contact the sensor 109 while providing space between the first side 122 of the body 114 and the sensor 109.

The present disclosure also includes an exemplary method of assembling the sensor holder 100 (shown in FIGS. 3 and 4) and/or sensor holder 154 (shown in FIG. 5) to the PCB 102. The method includes integrally forming the body 114, the retainer 116, and the support 118 such as, for example only, by injection molding. Alternatively, the body 114, the retainer 116, and the support 118 can be separately formed and later coupled together to form the sensor holder 100. Moreover, the body 114, the retainer 116, and the support 118 can be manufactured by bulk machining and/or additive manufacturing. The legs 148 of the support 118 are coupled to the PCB 102. The legs 148 can be removably coupled or integrally coupled to the PCB 102. During operation, the legs 148 suspend the base 138 and the arm 140 of the retainer 116 away from the PCB 102 while positioning the base 138 and the arm 140 to removably receive, suspend, hold and/or position the sensor 109. Additionally, the legs 148 position the body 114 of the sensor holder 100 or 154 between the sensor 109 and other electrical components 120.

A technical effect of the systems and methods described herein includes at least one of: (a) removably coupling a sensor holder to a printed circuit board of an electrical motor controller that positions a sensor away from the printed circuit board; (b) removably coupling a sensor holder to a printed circuit board of an electrical motor controller that reduces and/or eliminates adverse vibration effects to a sensor; (c) removably coupling a sensor holder to a printed circuit board of an electrical motor controller that provides a heat shield so that the sensor does not heat adjacent electrical components; (d) removably coupling a sensor holder to a printed circuit board of an electrical motor controller that reduces the number of parts in a bill of material and simplifies the assembly process of the electrical motor controller; and (e) removably coupling a sensor holder to a printed circuit board of an electrical motor controller that improves the thermal efficiency and heat transfer of the electric motor.

The exemplary embodiments described herein facilitate using a sensor holder to receive, hold and optimally position a sensor relative to a printed circuit board of an electrical motor controller. More particularly, the exemplary embodiments are configured to optimize space, increase structural strength, and increase thermal efficiencies. Still further, the exemplary embodiments increase operating efficiency and reduce operating and maintenance costs associated with the electric motor controller.

Exemplary embodiments of a sensor holder for an electrical machine and methods for assembling the sensor holder are described above. The methods and system are not limited to the specific embodiments described herein, but rather, components of the systems and/or steps of the methods may be utilized independently and separately from other components and/or steps described herein. For example, the methods may also be used in combination with other manufacturing systems and methods and are not limited to practice with only the systems and methods described herein. Rather, the exemplary embodiments can be implemented and utilized in connection with many other electrical component applications.

Although specific features of various embodiments of the disclosure may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor holder for holding a sensor relative to a printed circuit board of an electrical motor controller, the sensor holder comprising:
- a body having a first side and a second side;
- a retainer coupled to the first side and extending away from the first side and comprising a base coupled to the first side and includes an arm coupled to the base and extending away from the base wherein the base and arm are configured to receive the sensor;
- a spacer coupled to the first side and configured to form a space between the sensor and the first side; and
- a support coupled to the body and extending away from the body and coupled to the printed circuit board to position the retainer and the sensor away from the printed circuit board.

2. The sensor holder of claim 1, wherein the body includes a channel formed within the first side.

3. The sensor holder of claim 1, wherein the base and the arm are configured to removably receive the sensor.

4. The sensor holder of claim 1, wherein the base and the arm are configured to permanently receive the sensor.

5. The sensor holder of claim 1, wherein the base and the arm are arcuate shaped.

6. The sensor holder of claim 1, wherein the support comprises a first support and a second support.

7. The sensor holder of claim 1, wherein the support includes a leg coupled to the base and coupled to the printed circuit board, the leg configured to support the body and position the retainer away from the printed circuit board.

8. The sensor holder of claim 1, wherein the body, the retainer, and the support are integrally formed.

9. The sensor holder of claim 1, wherein the body, the retainer, and the support are non-integrally formed.

10. The sensor holder of claim 1, wherein the retainer comprises a first retainer and a second retainer.

11. The sensor holder of claim 10, wherein the retainer comprises a third retainer.

12. The sensor holder of claim 1, wherein the spacer comprises at least one section coupled to the first side.

13. The sensor holder of claim 12, wherein the spacer comprises a first section and a second section and wherein the body includes a channel formed within the first side and the channel is positioned between the first section and the second section.

14. The sensor holder of claim 1, wherein the body comprises an aperture defined through the first side and the second side.

15. An electrical motor comprising:
- a stator;
- a controller coupled to the stator; and
- a sensor holder coupled to the controller and comprising a body having a first side and a second side;

a retainer coupled to the first side and extending away from the first side and comprising a base coupled to the first side and includes an arm coupled to the base and extending away from the base wherein the base and arm are configured to receive a sensor;

a spacer coupled to the first side and configured to form a space between the sensor and the first side; and a support coupled to the body and extending away from the body and coupled to a printed circuit board of the controller to position the retainer and the sensor away from the printed circuit board.

* * * * *